Jan. 25, 1966  A. C. ARBOGAST  3,230,754
MEANS FOR FORMING TUBE FITTINGS
Filed Dec. 28, 1961  2 Sheets-Sheet 1
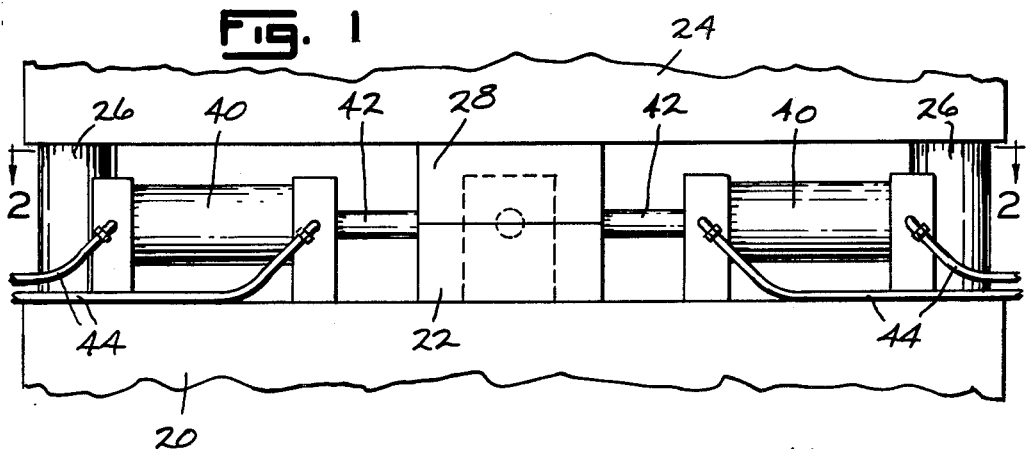
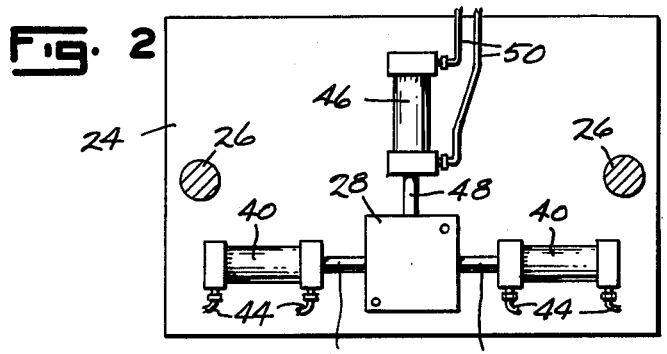
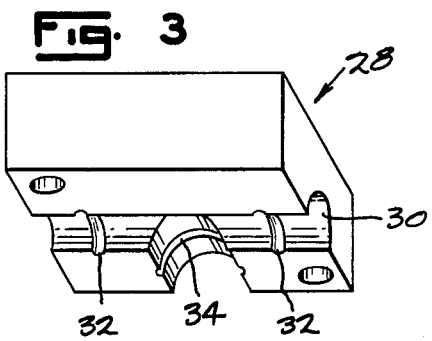
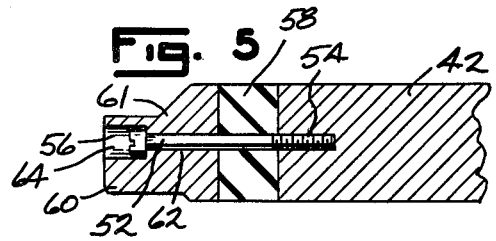
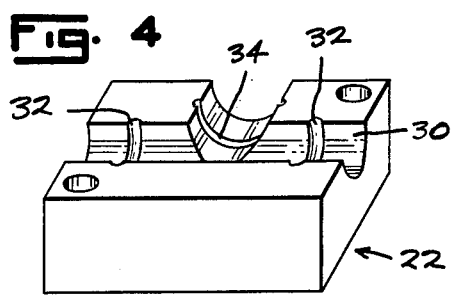
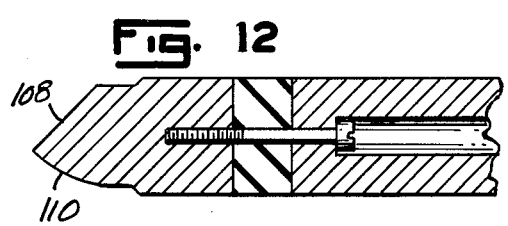
INVENTOR.
ALFRED C. ARBOGAST.
BY
Eugene C. Knoblock
ATTORNEY

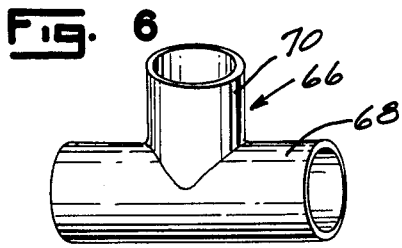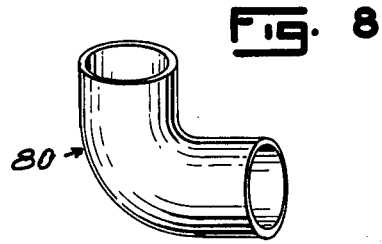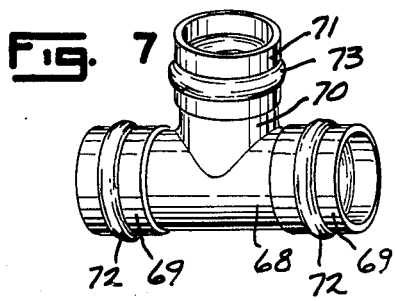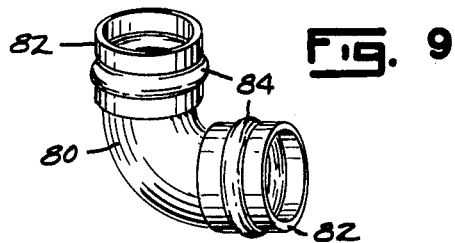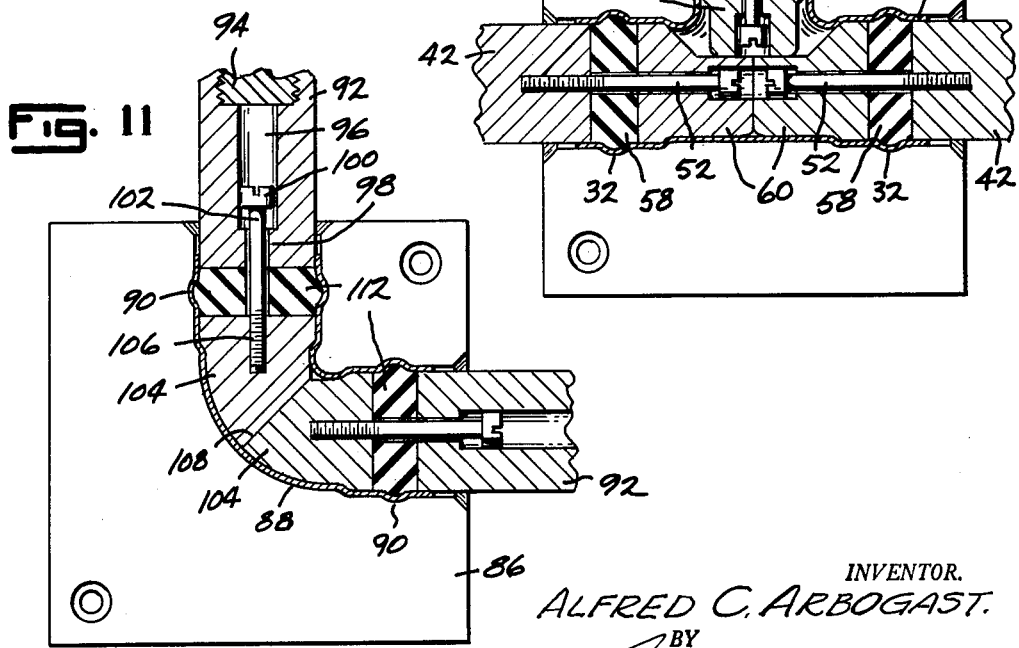

_United States Patent Office_

3,230,754
Patented Jan. 25, 1966

3,230,754
MEANS FOR FORMING TUBE FITTINGS
Alfred C. Arbogast, 1255 Oak St., Elkhart, Ind.
Filed Dec. 28, 1961, Ser. No. 162,814
8 Claims. (Cl. 72—316)

This invention relates to improvements in means for forming tube fittings, and more particularly to means for forming such fittings with circumferential beads adapted to receive and retain solder or like sealing material used to join and effectively seal the interfitting portions of male and female tubes or fittings.

The primary object of this invention is to provide a novel, and simple means for rapidly forming circumferential beads of preselected dimension at selected locations adjacent the ends of tubular fittings, such as elbows, T-fittings, X or cross fittings and straight unions.

A further object is to provide means for forming circumferential beads in tubular fittings, wherein a die has a die cavity adapted to receive a work piece and conforming to the contour of the fitting desired, said die being separable to readily accept and release the work piece, which apparatus also includes plungers forced into each opening of the die cavity and into abutment with each other at their inner ends, said plungers having expansible portions registering with selected bead outlining portions of the die cavity and adapted to expand radially to deform a tubular fitting blank into the bead outlining portion of the die cavity incident to the application of pressure upon the plungers while in abutment within the interior of the fitting.

A further object is to provide apparatus for forming a circumferential bead upon a tubular pipe fitting at a predetermined location at each of the end portions of such fitting, wherein a separable die with a die cavity receives a plurality of plungers, each having an expansible portion and an end portion adapted to abut the end portion of one or more other plungers and so shaped with relation to the fitting and the die cavity as to insure the position of yielding material at predetermined location in the fitting and the die at the point or points at which the fitting is to be expanded to form a circumferential bead.

Other objects will be apparent from the following specification.

In the drawings:

FIG. 1 is a fragmentary front elevation of apparatus employed to form a T-fitting;

FIG. 2 is a reduced view taken on line 2—2 of FIG. 1;

FIG. 3 is a perspective view of a top die member employed in forming a T-fitting;

FIG. 4 is a perspective view of a bottom die member used in forming a T-fitting;

FIG. 5 is an axial sectional view of a plunger used in the apparatus illustrated in FIGS. 1 to 4, inclusive;

FIG. 6 is a perspective view of a T-fitting blank;

FIG. 7 is a perspective view of a finished T-fitting having circumferential beads formed therein;

FIG. 8 is a perspective view of a blank of an elbow;

FIG. 9 is a perspective view of a finished elbow having circumferential beads formed therein;

FIG. 10 is an axial sectional view of the work piece mounted in a forming die and deformed by deforming plungers to produce a beaded T-fitting;

FIG. 11 is an axial sectional view of a tubular elbow mounted in a die and subjected to the action of forming plungers to form a beaded elbow; and FIG. 12 is an axial sectional view of a forming plunger utilized in forming a beaded elbow in the apparatus illustrated in FIG. 11.

Referring to the drawings and particularly to FIGS. 1 to 7, inclusive, and 10 which illustrate the formation of a T-fitting, the numeral 20 designates the bottom platen of a machine, such as a press, which serves to mount a bottom die member 22, such as illustrated in FIG. 4. The machine will also preferably be provided with an upper platen 24 shiftable by power relative to the lower platen 20 by any suitable means (not shown) and under the control or guidance of guide members or pins 26. The upper platen 24 mounts an upper die member 28, such as that illustrated in FIG. 3.

Each of the die members 22 and 28 has a die cavity 30 in its parting face conforming to the desired configuration of the work piece, and, in the form shown where the work piece is a T-shaped member, the die cavities 30 will be interrupted by enlarged transverse groove portions 32 adjacent the opposite ends of a straight continuous die cavity portion and by a transverse groove 34 in the perpendicularly extending portion of the die cavity. The cooperating die cavities will be of such configuration as to receive and snugly confine and retain a work piece therein when subjected to expanding pressures, for which purpose the presser machine will be provided with means (not shown) for exerting sufficient pressure upon the movable plates or platens, such as the upper plates 24, to insure that the parting faces of the die sections 22 and 28 will be hed in firm abutment during the application of internal expanding pressure therein.

The press or other machine which mounts the die parts 22, 28 also carries a plurality of power members or actuators arranged in selected orientation to the die 22, 28. As here illustrated, these actuators consist of fluid pressure responsive members which preferably are double acting cylinders. A pair of similar cylinders 40 are mounted upon the machine, as on the platen 20, in axial alignment with the straight cavity portion. Each of these cylinders has a piston (not shown) slidable therein, to which piston is connected an elongated piston rod or plunger 42 arranged to extend coaxially with and into the adjacent aligned portion of the die cavity. Fluid pressure lines 44 connect the actuators 40 to a suitable control valve (not shown) in a fluid pressure circuit or system in which fluid pressure of a predetermined value is available. A third fluid pressure actuator 46 is axially aligned with the cross portion of the die cavity and has a piston (not shown) from which projects a piston rod or plunger 48 coaxially with and adapted to enter the perpendicular leg of the die cavity. Fluid pressure lines 50 connect the actuator 46 to a pressure source and a control therefor.

Each of the actuator plungers 42 and 48 mounts a longitudinally extending headed member of predetermined length. The headed member may comprise a machine screw having a shank 52 with a screw-threaded end 54 screw-threaded in a recess in the end of the plunger and an enlarged head 56 preferably cylindrical. An annular member 58 formed of plastic or resilient compressible material, such as rubber synthetic rubber or elastomeric synthetic resin encircless a portion of the shank 52 with one face thereof in abutment with the end of the plunger. A plunger head 60 has a longitudinal bore 62 adapted to slidably receive the shank 52 and has an enlarged end recess or counterbore 64 adapted to slidably receive the head 56. The inner end of the plunger part 60 normally bears in face engagement with the elastomeric member 58. When the elastomeric member 58 is in normal or rest position, as illustrated in FIG. 5, the head 56 will preferably abut a shoulder between the counterbore 64 and the passage 62.

Normally the cross-sectional dimensions of the plungers 42 and 48 and of their respective elastomeric parts 58 and end parts or heads 60 will be such as to fit snugly within the aligned portions of the T-shaped work piece, such as a T-fitting 66, as illustrated in FIG. 6 and characterized by a cross-head 68 and a perpendicular leg portion 70. The T-fitting 66 may be formed of any suitable material. Thus the fitting may constitute a wrought fitting formed of brass, copper, aluminum, steel or any other material capable of being worked while cold. The heads 60 of the aligned plungers 42 which enter the opposite ends of the cross-head 68 of the fitting are preferably cut away at 61 at the side thereof which confronts the cross-leg 70 of the fitting, as illustrated in FIG. 5. The heads 60 are preferably of substantially equal length, and the elastomeric members 58 on the plungers 42 are preferably of substantially equal axial dimension so that the inner ends of the heads 60 will abut in a plane common to the axis of the cross-leg portion 70 of the fitting, as illustrated in FIG. 10. The head 60' of the plunger 48 is of a length to abut the cutaway portions 61 of the heads 60 when the elastomeric ring 58' registers with the bead outlining groove 34 of the die cavity. It will also be observed that the elastomeric rings 58 of the plungers 42 register with the bead-forming grooves 32 of the die cavity when the heads 60 of the plungers 42 abut.

FIG. 7 illustrates a finished T-fitting wherein enlarged bell ends 69 and 71 have been formed in the parts 68 and 70, respectively, of the fitting blank 66, illustrated in FIG. 6, and in which circumferential beads 72 and 73 are formed in the bells 69 and 71, respectively. The formation of the enlarged bell ends 69 and 71 will preferably be accomplished by a step of the process or operation separate from the step by which the beads 72 and 73 are formed. Thus the die cavity 30 may take the shape illustrated in FIG. 10 to conform to the shape of the work piece after the enlarged bell ends 69, 71 have been formed in the work piece. However, if desired, means may be provided for successively forming the bells 69 and 71 in the work piece and the beads 72 and 73 while the work piece remains fixed in a given die cavity, in which event dual actuators will preferably be provided upon the machine at each station and will be mounted upon an index mechanism which permits them to be selectively brought into registration with the portion of the work piece within the die cavity in which they are to perform their respective functions.

The operation of forming beads upon the end portions of a T-fitting is illustrated in FIG. 10, wherein it will be seen that plungers 42 enter the work piece at opposite ends of the cross-part 68 thereof until their heads 60 abut, and that plunger 48 enters the perpendicular part 70 of the fitting until its end part 60' abuts the offset portion 61 of the plunger parts or heads 60. After the plunger heads or parts 60 and 60' are brought into engagement with each other, as illustrated in FIG. 10, the further application of pressure upon the plungers 42 and 48 in an inward direction relative to the die and the fitting therein causes axial compression of the elastomeric rings 58 and 58', respectively, which in turn produces radial expansion of those elastomeric rings within the tubular fitting at the portion registering with the die cavity grooves 32 and 34. This expansion radially of the resilient or elastomeric members 58 and 58' results in simultaneous expansion of parts of the work piece to conform to the configuration of the bead-shaping grooves 32 and 34 of the die cavity, and thereby produces formation of the circumferential beads simultaneously and in proper location upon the work piece. It will also be noted that during this application of pressure, the heads 60 of the plungers 42 at the parts diametrically opposed to the surfaces 61 at which the plunger 60' bears will engage the inner face of the work piece at a point at which it is fully supported by the die. Thus, although plunger 48 applies to the heads or ends 60 of the plungers 42, force in a direction perpendicular to the length of the plungers 42 and their heads 60 and to the guide pins 52, no lateral flexing or deforming of the parts 52 or 60 will result. It will also be observed that the counterbore portion 56 in the end part of each plunger will be of such length that the heads 56 of the respective guide pins 52 carried by the plunger will remain confined within the counterbore during the forming operation. In other words, when the elastic members 58 and 58' have been compressed axially to the full extent required to form the beads 72 and 73, the heads 56 of the guides will remain within the confines of the counterbores in which they are received while the parts are in their normal axially expanded position, as illustrated in FIG. 5.

It will be apparent that after the plungers 42 and 48 have reached the end of their bead-forming stroke so that the beads have been formed in the fittings, the removal of the work piece can be accomplished rapidly. The plungers 42 and 48 are withdrawn by proper operation of their actuators 40 and 46, it being apparent that the first action resulting from the commencement of such withdrawal is the release of axial pressure upon the resilient members 58 and 58' so that they are permitted to resume their normal configuration to withdraw from the bead of the fitting which was formed by their prior expansion. After the plungers have resumed their normal shape they freely slide out of the formed fitting. The press will be opened to separate the dies 22, 28, either simultaneously with the withdrawal of the plungers or in selected sequence or timed relation to the withdrawal of the plungers, so as to expose the finished work piece and permit its withdrawal by a workman, followed by insertion of a work piece to be formed, closing of the die cavities, and inward movement of the plungers, as is required to form the next work piece.

FIG. 8 illustrates a tubular elbow 80 which is adapted to be reshaped to provide bell or enlarged ends 82 and circumferential bead 84 at a selected position in each bell end.

The apparatus which provides the means for forming the beads 84 is illustrated in FIGS. 11 and 12. A two-part die 86, having complementary die cavities 88 in its parting faces, conforms to the configuration of the desired tubular fitting or work piece and is characterized by the transverse bead-shaping grooves 90. It will be understood that the die parts 86 are mounted within a machine, permitting selected separation and abutment of the dies, for example, a machine having opposed plates, such as 20 and 24, illustrated in FIG. 1.

A pair of actuators similar to the actuators 40 and 46, illustrated in FIGS. 1 and 2, are carried by the machine with their respective plungers 92 axially aligned with the respective ends of the die cavity 88 open at side faces of the die blocks 86. Each of the plungers 92 is preferably sectional, with the outer end 92 thereof mounted upon an inner part 94, as by a screw-threaded fit or any other suitable connection. Each plunger part 92 has an axial bore 96 therein for a portion of its length, with which communicates a coaxial reduced diameter bore portion 98. The bore part 96 slidably receives the head 100 of a shank or stem 102 slidable in the bore part 98. Resilient or elastic annular member 112 encircles the stem 102 of the guide with its inner face abutting the adjacent end of the plunger part 92. The diameter of the resilient part 112 is preferably normally uniform and has a sliding fit within the fitting to be formed. A plunger head or end member 104 is mounted upon the guide stem 102 as by a screw-threaded connection at a screw-threaded end part 106 of said stem. The parts are normally positioned as illustrated in FIG. 12, with the opposite surfaces of the elastic member 112 abutting the plunger parts 92 and 104 when the head 100 of the guide stem 102 seats at the shoulder between the guide passages 96 and 98. The diameter of the head 104 will also be such as to provide a normal free sliding fit thereof into the elbow to be worked. The inner end portion of each plunger head 104 is characterized by a beveled or oblique abutting face 108 which preferably extends at an angle of 45 degrees to the axis of the guide stem 102. Likewise, the portion 110 of the surface of the plunger part 104 is curved so as to substantially conform to the configuration of the inner face of the fitting at the large radius portion of its bend.

It will be apparent from FIG. 11 that the bead-forming operation is performed by mounting the elbow fitting within the die cavity 88 of the separable die 86 and then moving the two plungers 92 into the die cavities and the end portions of the work pieces 80 until the end faces 108 of the plunger parts 104 abut and the surfaces 110 of the plunger parts 104 engage the inner surfaces of the elbow at the bend. Continued axial inward movement of the plungers 92 after the faces 108 abut produces axial compression and radial expansion of the resilient annular members 112 which produces simultaneous reshaping of the metal at the two ends of the elbow so as to simultaneously produce the two beads 84 at the elbow.

While I have illustrated herein the apparatus for forming beads upon T-fittings and elbows only, it will be apparent that the same procedure may be employed to form beads at selected positions to extend circumferentially of other types of tubular members or fittings, such as straight unions or cross or X-fittings, with the same advantageous results and with assured uniformity of all circumferential beads simultaneously produced by the apparatus upon the work piece or fitting. It will also be apparent that the apparatus disclosed and described herein for producing beads on elbows is applicable to elbows having bends of short radius. The above described method of forming beads is also useful in working elbows having bends of large radius, but the apparatus must be changed by substituting for the unitary rigid plunger heads 104 suitable plunger heads which will conform to a bend of large radius, such as plunger heads of jointed character capable of following the curvature of the large radius elbow bend and adapted to abut at their ends to compress axially and expand radially the resilient plunger parts 112 which form the beads 90 in the elbow.

While the preferred embodiments of the invention have been illustrated and described, it will be understood that changes in the construction may be made within the scope of the appended claims without departing from the spirit of the invention.

I claim:
1. In combination,
a multi-part separable die having a die cavity formed partly in each die part and shaped to receive a tubular fitting,
said die cavity having at least two runs open at side faces of said die and each interrupted by a circumferential groove, said grooves being spaced apart,
a plunger aligned with each open run and slidable in a fitting in said cavity,
means for advancing said plungers axially into said open runs and into forcible abutment at their inner ends within a fitting and for retracting said plungers therefrom,
each plunger constituting a unit including a resilient portion positioned within the cavity part defined by a groove when said plungers abut in said die cavity and a rigid abutment part at its inner end and shiftable relative to an outer end part of said plunger.
2. In combination,
a separable die having a die cavity shaped to receive a tubular elbow fitting,
said cavity being open at two sides of said die and having spaced circumferential grooves therein,
a plunger aligned with each open ended portion of said die cavity and slidable in a fitting in said cavity,
means for simultaneously forcibly advancing said plungers in angularly disposed directions into end engagement in said cavity and fitting and for retracting said plungers from said cavity and fitting,
each plunger having a longitudinally shiftable head and a resilient radially expansible portion intermediate its ends and behind said head and positioned in the part of the cavity defined by a groove when said plunger heads abut.
3. The combination defined in claim 2, wherein said plunger heads have beveled abutting end faces.
4. The combination defined in claim 2, wherein said plunger heads have beveled end faces abutting each other and curved end faces abutting said fitting.
5. The combination defined in claim 2, wherein said plunger heads have end faces curved to substantially conform to the interior curvature of said fitting.
6. In combination,
a separable die having a die cavity with angularly extending runs shaped to receive a tubular T-fitting,
said cavity being open at the sides of said die and having a circumferential groove in each of the angularly extending die cavity runs thereof, said grooves being spaced apart,
a plunger aligned with each open ended portion of said die cavity and slidable in a fitting in said cavity,
means for advancing said plungers into forcible engagement in said cavity and fitting and for retracting said plungers therefrom,
each plunger having a resilient radially expansible portion intermediate its ends and positioned in the part of a die cavity having a circumferential groove when at the inner end of the stroke of said advancing means and a rigid abutment part at its inner end and shiftable relative to an outer end part of said plunger.
7. The combination defined in claim 6, wherein aligned plungers abut at the inner ends of their strokes, and the inner end of an angular plunger abuts the inner end portions of said aligned plungers.
8. The combination defined in claim 6, wherein aligned plungers abut at the inner ends of their strokes and are cut away at the portion thereof confronting the angular portion of said fitting,
the inner end of the plunger in the angular portion of said fitting abutting said cut-away portions of said aligned fittings.

References Cited by the Examiner
UNITED STATES PATENTS

| | | | |
|---|---|---|---|
| 616,764 | 12/1898 | Bourke. | |
| 1,041,406 | 10/1912 | Bauroth | 113—44 |
| 1,754,922 | 4/1930 | Weldon | 113—44 |
| 1,960,788 | 5/1934 | Maroto | 29—157 |
| 2,132,002 | 10/1938 | Hight | 113—44 |
| 2,535,403 | 12/1950 | Froggatt | 153—79 XR |
| 2,952,070 | 9/1960 | Veatch | 113—44 |

CHARLES W. LANHAM, *Primary Examiner.*